(12) United States Patent
Kim et al.

(10) Patent No.: US 7,266,300 B2
(45) Date of Patent: Sep. 4, 2007

(54) BPSR OPTICAL TRANSMISSION NODE

(75) Inventors: Sung-Kee Kim, Seoul (KR); Young-Hun Joo, Suwon-shi (KR); Seong-Taek Hwang, Pyongtaek-shi (KR)

(73) Assignee: Samsung Electronics Co., Ltd., Suwon-si, Gyeonggi-Do (KR)

( * ) Notice: Subject to any disclaimer, the term of this patent is extended or adjusted under 35 U.S.C. 154(b) by 701 days.

(21) Appl. No.: 10/458,171

(22) Filed: Jun. 10, 2003

(65) Prior Publication Data
US 2004/0114926 A1    Jun. 17, 2004

(30) Foreign Application Priority Data
Dec. 11, 2002   (KR) ................. 10-2002-0078670

(51) Int. Cl.
*H04J 14/02*    (2006.01)
(52) U.S. Cl. .............................. 398/85; 398/82; 398/83
(58) Field of Classification Search ................. 398/59, 398/10, 17, 21, 883–85, 87
See application file for complete search history.

(56) References Cited

U.S. PATENT DOCUMENTS

| | | | | |
|---|---|---|---|---|
| 5,633,741 A | * | 5/1997 | Giles | 398/79 |
| 5,742,416 A | * | 4/1998 | Mizrahi | 398/92 |
| 5,995,259 A | * | 11/1999 | Meli et al. | 398/92 |
| 6,160,660 A | * | 12/2000 | Aina et al. | 359/341.2 |
| 6,175,444 B1 | * | 1/2001 | Toyohara | 359/341.2 |

(Continued)

FOREIGN PATENT DOCUMENTS

EP   1221779 A2   10/2001

OTHER PUBLICATIONS

Kim et al, "2.5 Gb/s ×16-Channel Bidirectional WDM Transmission System Using Bidirectional Erbium Doped-Fiber Amplifier Based on Spectrally Interleaved Synchronized Etalon Filters", IEEE Photonics Technology Letters, vol. 11, No. 6, Jun. 1999.*

(Continued)

*Primary Examiner*—Kenneth Vanderpuye
*Assistant Examiner*—Luis Garcia
(74) *Attorney, Agent, or Firm*—Cha & Reiter, LLC

(57) ABSTRACT

A bi-directional path switched ring optical transmission node has simple configuration which reduces the influence of a wave reflected by an obstacle on optical line.The BPSR optical transmission node connects to a first optical line through which an odd channel signal and an even channel signal are transmitted to and from the BPSR optical transmission node in direction opposite to each other. The BPSR optical transmission node further connects to a second optical line through which the odd channel signal and the even channel signal are transmitted from and to the BPSR optical transmission node in direction opposite to each other. The BPSR optical transmission n-ode includes a node section for directing the odd channel signal and the even channel signal, dropping/adding a desired channel from/to the odd channel signal and the even channel signal,and then allowing each of the odd channel signal and the even channel signal to proceed in a direction traveled by that channel signal upon arriving at the BPSR optical transmission node; and filtering section coupled between the node section and respective optical lines, the filtering section allowing only one of the odd channel signal and the even channel signal to pass without attenuating the signal.

13 Claims, 3 Drawing Sheets

U.S. PATENT DOCUMENTS

| | | | |
|---|---|---|---|
| 6,278,536 B1 * | 8/2001 | Kai et al. | 398/79 |
| 6,529,656 B2 * | 3/2003 | Lee et al. | 385/24 |
| 6,690,886 B1 * | 2/2004 | Guy | 398/81 |
| 6,999,653 B2 * | 2/2006 | Lee et al. | 385/24 |
| 2001/0038477 A1 | 11/2001 | Hwang | |
| 2002/0028039 A1 | 3/2002 | Lee et al. | |
| 2002/0067526 A1 * | 6/2002 | Park et al. | 359/127 |
| 2002/0089719 A1 * | 7/2002 | Joo et al. | 359/127 |
| 2002/0106146 A1 * | 8/2002 | Lauder et al. | 385/24 |

OTHER PUBLICATIONS

Y. Loo et al.; "640 Gb/s Bidirectional Optical Transmission by Sharing Optical Amplifiers and DCF;" Conference on Lasers and Electro-Optics; May 19-24, 2002; XP 010606990.

* cited by examiner

BPSR OPTICAL TRANSMISSION NODE

CLAIM OF PRIORITY

This application claims priority to an application entitled "BPSR optical transmission node," filed in the Korean Intellectual Property Office on Dec. 11, 2002 and assigned Serial No. 2002-78670, the contents of which are hereby incorporated by reference.

BACKGROUND OF THE INVENTION

1. Field of the Invention

The present invention relates to an optical communication. More particularly, the present invention relates to a bi-directional path switched ring (referred to as "BPSR" hereinafter) optical transmission node.

2. Description of the Related Art

When forming a network by means of a BPSR optical transmission node which has a BPSR configuration and uses one optical fiber, the configuration of the network is simple, a switching time required for a projection is short, and performance of the optical fiber is excellent.

A conventional 2×2 interleaver 10 is described as follows with reference to FIG. 1. The conventional 2×2 interleaver is an optical filtering element which directs a received signal to diagonal and straight ports when the received signal has odd and even channels, respectively.

As shown in FIG. 1, when an odd channel signal enters the 2×2 interleaver 10 through a port A 11, the interleaver 10 directs the odd channel signal to a port D 14. When an even channel signal enters the 2×2 interleaver 10 through the port A 11, the interleaver 10 directs the even channel signal to a port C 13. Consequently, when both of the odd channel signal and the even channel signal enter one port, namely, the port A of the 2×2 interleaver 10, the odd channel signal and the even channel signal are directed to the port D 14 and the port C 13 thereof, respectively. Accordingly, the signals are separated by channels. When the odd channel signal and the even channel signal are inputted to the port A 11 and the port B 12, respectively, both of the odd channel and the even channel signal are directed to the output port D 14. Inputs to ports B, C, and D operate in the same manner as described above with regard to the input to the port A. The 2×2 interleaver 10 directs in a common direction for subsequent amplification odd channel signals and even channel signals traveling in different directions and then re-directs the signals in their original direction after amplification. Consequently, the 2×2 interleaver 10 is useful for optical transmission using a bi-directional line.

FIG. 2 shows the configuration of a conventional BPSR optical transmission node using 2×2 interleaver.

The conventional BPSR optical transmission node using 2×2 interleaver is a ring node which directs an odd channel and an even channel to diagonal and straight directions through one optical fiber, respectively, and advantageously has a simple structure.

The operation of the conventional BPSR optical transmission node will be described with reference to FIG. 2. A first optical line 21 receives an odd channel signal and directs the odd channel signal to an input terminal of an amplifier 24 via an interleaver 23. A second optical line 22 receives an even channel signal and directs the even channel signal to the input terminal of the amplifier 24 via the interleaver 23. The amplifier 24 amplifies the odd channel signal and the even channel signal from the first and second optical lines 21, 22, respectively, and provides the amplified odd and even channel signals to an optical add/drop multiplexer (referred to as a "ADM" hereinafter) 25. The ADM 25 is a main element of a wavelength division multiplexing transmission system and is coupled at a predetermined point between a transmitting terminal and a receiving terminal. The ADM 25 selectively adds or drops each channel of the amplified signals in succession from the amplifier 24. The odd channel signal from the ADM 25 is directed to the second optical line 22 through the interleaver 23. The even channel signal from the ADM 25 is directed to the first optical line 21 through the interleaver 23.

According to the BPSR optical transmission node using 2×2 interleaver, a single amplifier amplifies optical signals which are directed to both directions. Demand for BPSR optical transmission nodes has risen due to their simple configuration. However, when something is wrong at least with either of the first or second optical lines 21 and 22, it is difficult to detect the wrong state, since the odd channel signal and the even channel signal are simultaneously detected during an amplifying cycle through the first optical line 21, the second optical line 22, and the interleaver 23.

Furthermore, it is difficult to detect the occurrence of an obstacle such as a cutting of the optical fiber. Since a reflected wave passes through an amplifier, the wrong transmission of a signal occurs due to the reflected wave. In general, the reflected wave is not influenced significantly by a Rayleigh back scattering. However, the reflected wave is a reflection of a signal that has been amplified, and, as such, has sufficient intensity to interfere with signals not yet amplified and therefore relatively weak.

The amount of reflection generated from an optical fiber normally varies according to the kind of the optical fiber and the wavelength of the signal in use. The reflected wave has an amplitude that has been reduced by about 32 dB due to Rayleigh back scattering. An ideal interleaver perfectly removes the reflected wave generated from the optical fiber by the Rayleigh back scattering. However, a real interleaver reduces the reflected wave by about 20 dB. Consequently, the intensity of the reflected wave which is inputted to the 2×2 interleaver has been reduced by about −52 dB.

For example, the span of a standard single mode optical fiber is 40~50 km. Assuming a span loss of the optical fiber in the BPSR optical transmission node of about 10~15 dB, a destination signal, i.e., desired signal, that has undergone a span loss of about 10~15 dB arrives at the amplifier input terminal. Accordingly, the reflected wave reduced by about −52 dB has an intensity of about 37~42 dB below that of the destination signal. Since a signal having an intensity of at least 30 dB less than that of a desired signal does not much affect the transmission characteristic of the desired signal, a reflected wave having an intensity of 37~42 dB below that of the destination signal has a little influence on the destination signal.

However, when the obstacle is due to cutting of the optical fiber, the intensity of the reflected wave is attenuated merely by about 14 dB, so that after passing through the interleaver, the intensity of the undesirable signal has decreased by a total of 34 dB. Assuming a span loss in the optical fiber of 10~15 dB, the intensity of the reflected wave at an input terminal of the amplifier becomes −24~−19 dB in comparison with that of the destination signal. Thus, the wave reflected due to the cutting of the optical fiber detrimentally affects destination signals, i.e. lowers transmission quality.

A conventional BPSR optical transmission node using four interleavers as shown in FIG. 3 is utilized to detect obstacles, such as the cutting of an optical fiber, and to mitigate the influence of the reflected wave during the occurrence of an obstacle.

Referring now to FIG. 3, the conventional BPSR optical transmission node includes four 1×2 interleavers each having a number of inputs or outputs one less than that of the 2×2 interleaver.

The operation of the 1×2 interleaver will be described by using the 2×2 interleaver shown in FIG. 1. In a first 1×2 interleaver 33, an odd channel signal is inputted through a port A, and the inputted odd channel signal is directed to a diagonal port D. An even channel signal is inputted through a port C, and the inputted even channel signal is directed to a straight port A. However, a port B is not used in first 1×2 interleaver 33. In a second 1×2 interleaver 34, an odd channel signal is inputted through a port A, and the inputted odd channel signal is directed to a diagonal port D. An even channel signal is inputted through a port D, and the inputted even channel signal is directed to a straight port B. However, a port C is not used in the second 1×2 interleaver 34.

In a third 1×2 interleaver 35 operating as a multiplexer, an odd channel signal is inputted through a port A, and the inputted odd channel signal is directed to a diagonal port D. An even channel signal is inputted through a port B, and the inputted even channel signal is directed to a straight port D. However, a port C is not used in the third 1×2 interleaver 35. In a fourth 1×2 interleaver 36 operating as a demultiplexer, an odd channel signal is inputted through a port A and the input odd channel signal is directed to a diagonal port D. An even channel signal is inputted through a port A, and the inputted even channel signal is directed to a straight port C. However, a port B is not used in the fourth 1×2 interleaver 36.

In the operation of the conventional BPSR optical transmission node using four 1×2 interleavers 33, 34, 35, and 36, a first optical line 31 receives an odd channel signal. The received odd channel signal is provided to an amplifier 37 via first and third interleavers 33, 35. A second optical line 32 receives an even channel signal. The received even channel signal is provided to the amplifier 37 via second and third interleavers 34 and 35. The amplifier 37 simultaneously amplifies the odd channel signal and the even channel signal from the first and second optical lines 31 and 32, respectively. The amplified odd and even channel signals are passed through an ADM 38. The amplified odd channel signal from the ADM 38 is directed to the second optical line 32 via the fourth interleaver 36 and the second interleaver 34. The amplified even channel signal from the ADM 38 is directed to the first optical line 31 via the fourth interleaver 36 and the first interleaver 33.

When an obstacle occurs during the above operation, the reflected wave passes through two interleavers, namely, either the first and third interleavers 33, 35 or the second and third interleavers 34, 35 before amplifying the reflected wave. Accordingly, the intensity of the reflected wave is reduced by about 40 dB by the two interleavers so that it is reduced by an additional 20 dB in comparison with the interleaver shown in FIG. 2. Consequently, even though the intensity of the reflected wave is decreased a mere 14 dB due to the cutting of an optical fiber, and assuming a span loss in the optical fiber of 10-15 dB, the intensity of an undesirable signal in an input terminal of the amplifier falls 39~44 dB below that of the destination signal. The reflection therefore does not affect significantly the transmission characteristic of a desired signal. Also, since only the odd channel signal is directed to the first interleaver 33 and the third interleaver 35, and the fourth interleaver 36 and the second interleaver 34, photo detectors are installed between the first interleaver 33 and the third interleaver 35, and between the fourth interleaver 36 and the second interleaver 34 and detect whether or not obstacles occur during a transmission of the odd channel signal. Similarly, since only the even channel signal is directed to the second interleaver 34 and the third interleaver 35, and the fourth interleaver 36 and the first interleaver 33, photo detectors are installed between the second interleaver 34 and the third interleaver 35, and between the fourth interleaver 36 and the first interleaver 33 and detect whether or not obstacles occur during a transmission of the even channel signal.

Although the conventional BPSR optical transmission node shown in FIG. 3 detects the occurrence of an obstacle and mitigates the influence of the reflected wave during the occurrence of an obstacle, four interleavers are used, causing the construction thereof to be complicated. Furthermore, a temperature control circuit normally used in order to stably operate the four interleavers adds complexity to and increases the size of the conventional BPSR optical transmission.

SUMMARY OF THE INVENTION

The present invention is directed to solving the above-mentioned problems of the prior art by providing an easily designed BPSR optical transmission node with a simple configuration that reduces the influence of a wave that has been reflected due to the occurrence of an obstacle such as a cutting of an optical fiber.

Advantageously, a BPSR optical transmission node of the present invention also detects the occurrence of an obstacle such as the cutting of an optical fiber.

In accordance with the present invention, a bi-directional path switched ring (BPSR) optical transmission node connected to a first optical line through which an odd channel signal and an even channel signal are respectively transmitted to and from the BPSR optical transmission node in directions opposite to each other, the BPSR optical transmission node being further connected to a second optical line through which the odd channel signal and the even channel signal are respectively transmitted from and to the BPSR optical transmission node in directions opposite to each other, the BPSR optical transmission node comprising: a node section for directing the odd channel signal and the even channel signal in an equal direction, for amplifying the odd channel signal and the even channel signal, for dropping/adding a desired channel from/to the odd channel signal and the even channel signal, and for then allowing each of the odd channel signal and the even channel signal to proceed in a direction traveled by that channel signal upon arriving at the BPSR optical transmission node; a first filtering means coupled between the first optical line and the node section, the first filtering means allowing only the odd channel signal from among signals transmitted through the first optical line to pass through the first filtering section without substantially any attenuation by said first filtering means the first filtering means transferring the even channel signal from the node section to the first optical line; and a second filtering means coupled between the second optical line and the node section, the second filtering means allowing only the even channel signal from among signals transmitted through the second optical line to pass through the second filtering section without substantially any attenuation by said second filtering means, the second filtering means transferring the odd channel signal from the node section to the second optical line.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying FIG. 4, and note that a numerical value related to the products can be changed.

Figure 1:
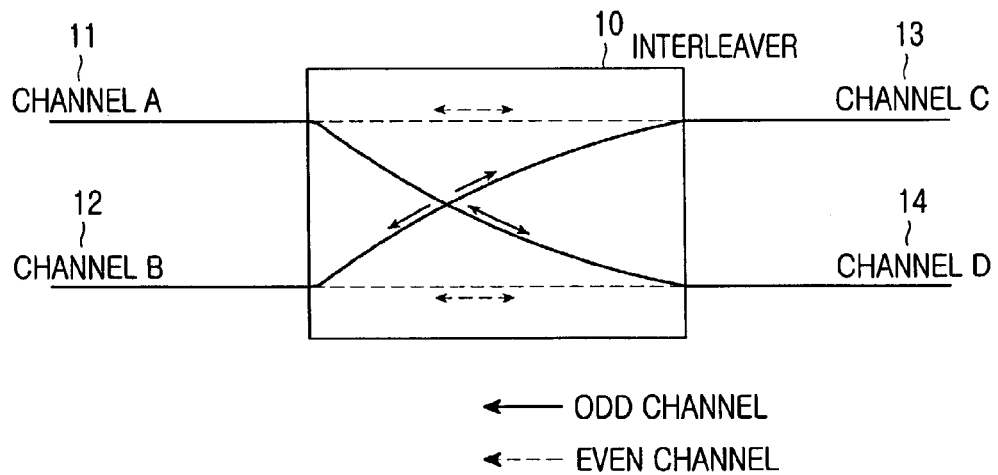
FIG. 1 is a view showing the conventional 2×2 interleaver.
Figure 2:
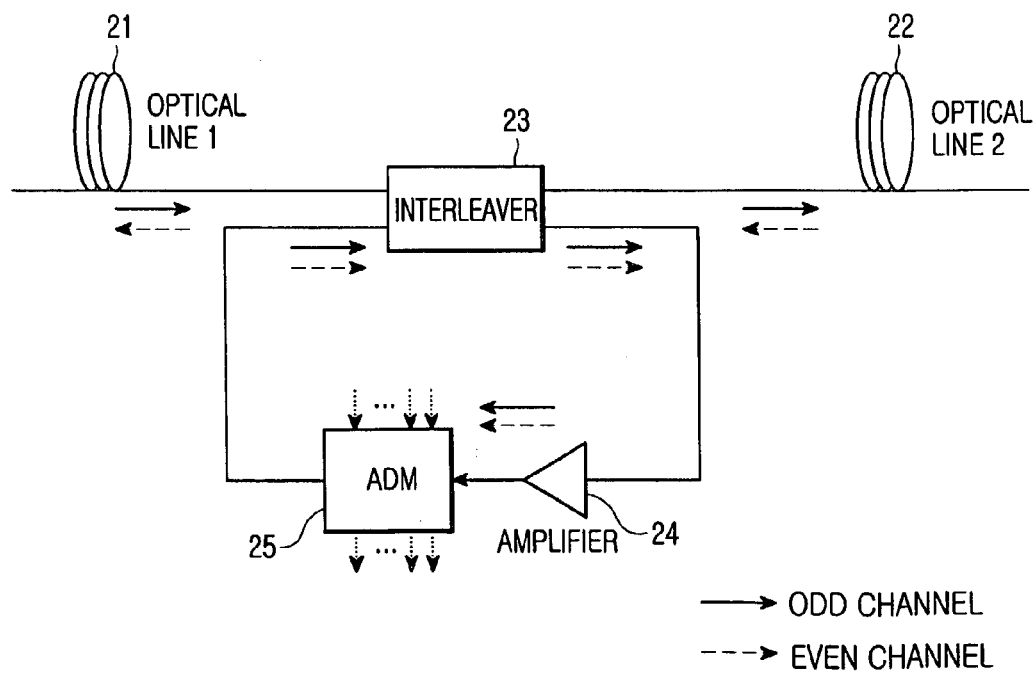
FIG. 2 is a block diagram showing the configuration of a conventional BPSR optical transmission node using 2×2 interleaver.
Figure 3:
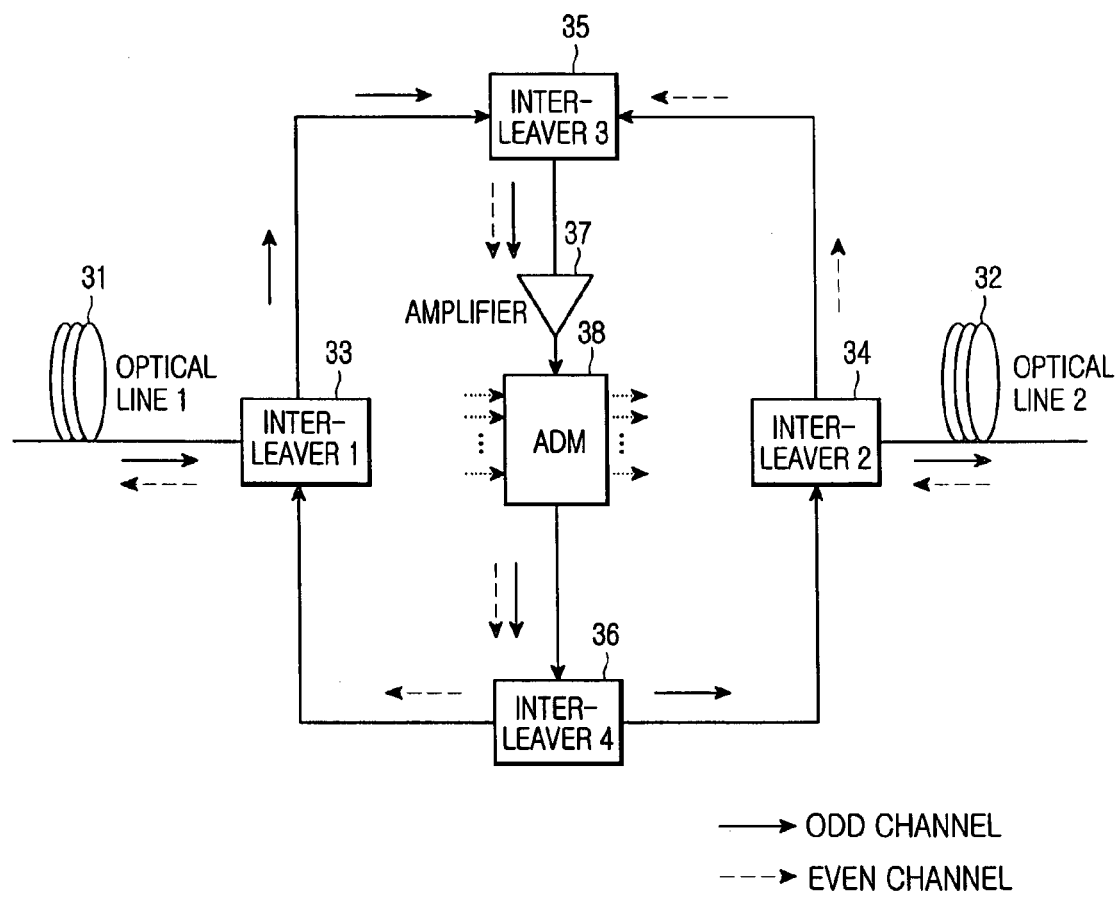
FIG. 3 is a block diagram showing the configuration of a conventional BPSR optical transmission node using 4 interleavers.
Figure 4:
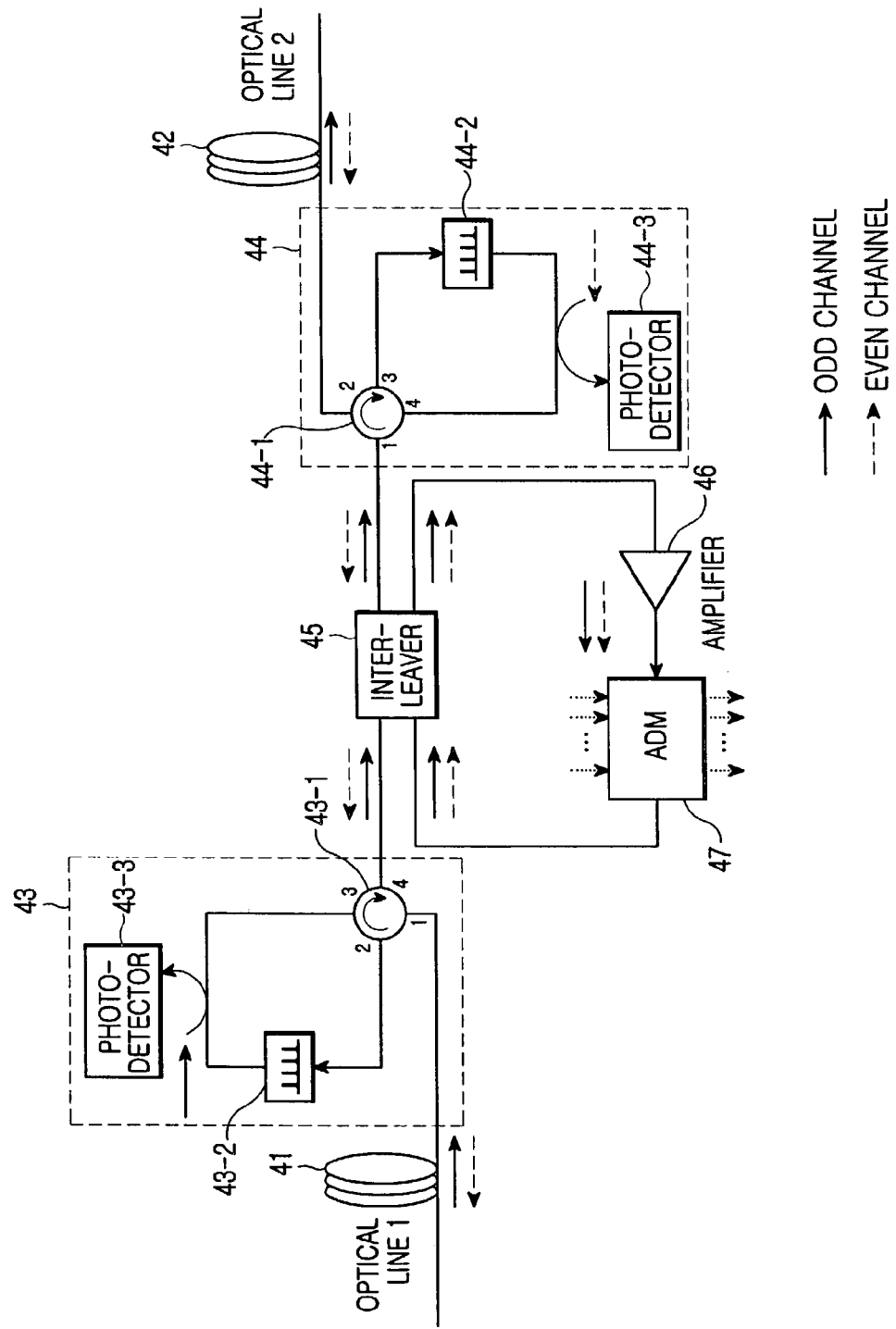
FIG. 4 is a block diagram showing the configuration of a BPSR optical transmission node using 2×2 interleaver according to an embodiment of the present invention.

FIG. 4 is a block diagram showing the configuration of a BPSR optical transmission node using 2×2 interleaver according to an embodiment of the present invention.

The BPSR optical transmission node includes a first optical line 41, a second optical line 42, a node section, a first filtering section 43, and a second section 44.

The first optical line 41 receives a first signal of the bi-directional path switched ring optical transmission node having odd and even channel signals. The first optical line bi-directionally transmits odd and even channel signals of a first optical signal in directions opposite to each other. The second optical line 42 bi-directionally transmits the odd and even channel signals of the second optical signal in directions opposite to each other.

The node section includes an amplifier 46, an optical add/drop multiplexer 47, and an interleaver 45 and is communicatively disposed between the first and second optical lines. The node section simultaneously amplifies the odd and even channel signals arriving at the amplifier 46. The node section then adds and drops desired channels from the amplified odd and even channel signals and subsequently routes each of the amplified odd and even channel signals in a direction traveled by that channel signal upon arriving at the BPSR optical transmission node.

The first filtering section 43 is coupled between the first optical line 41 and the node section. The first filtering section 43 passes the odd channel signal received by the first optical line 41 and transmits the even channel signal from the node section to the first optical line 41. The second filtering means 44 is coupled between the second optical line 42 and the node section. The second filtering section 44 passes the even channel signal received by the second optical line 42 and transmits the odd channel signal from the node section to the second optical line 42.

The BPSR optical transmission node is a ring node which transmits an odd channel signal and an even channel signal to a diagonal direction and a straight direction using one optical fiber. The BPSR optical transmission node has a simple construction.

An operation of the BPSR optical transmission node according to the present invention will now be explained with reference to FIG. 4.

A first optical line 41 receives an odd channel signal of a BPSR optical transmission signal. The received odd channel signal is directed to an input terminal of an amplifier 46 via a first filtering section 43 and an interleaver 45. Also, a second optical line 42 receives an even channel signal of a BPSR optical transmission signal. The received even channel signal is directed to the input terminal of the amplifier 46 via a second filtering section 44 and the interleaver 45. The amplifier 46 simultaneously amplifies the odd channel signal and the even channel signal from the first and second optical lines 41 and 42, respectively. The amplified odd and even channel signals are provided to an ADM 47. The ADM 47 adds or drops a predetermined traffic to or from the amplified odd and even channel signals from the amplifier 46. The added/dropped odd channel signal from the ADM 47 is directed to the second optical line 42 via the interleaver 45 and the second filtering section 44. The added/dropped even channel signal from the ADM 47 is directed to the first optical line 41 via the interleaver 45 and the first filtering section 43.

The first filtering section 43 includes a first circulator 43-1 and a first filter 43-2. The first circulator 43-1 directs the odd channel signal received from the first optical line 41 to the first filter 43-2. The first circulator 43-1 directs the signal transmitted from the interleaver 45 to the first optical line 41. The first filter 43-2 passes only the odd channel signal of the BPSR optical transmission signal received by the first optical line 41. The first filter 43-2 includes an Etalon filter. When the Etalon filter is used for the first filter 43-2 as a filtering element, it functions as a passive element so that other components to operate the passive element become unnecessary. A first Etalon filter (EF) 43-2 passes only the odd channel signal. When the even channel signal is transmitted to the first EF 43-2, the first EF 43-2 reduces the intensity of the even channel signal by about 15 dB.

The second filtering section 44 includes a second circulator 44-1 and a second filter 44-2. The second circulator 44-1 directs the even channel signal received by the second optical line 42 to the second filter 44-2. The second circulator 44-1 directs the signal transmitted from the interleaver 45 to the second optical line 42. The second filter 44-2 passes only the even channel signal of the BPSR optical transmission signal received by the second optical line 42. The second filter 44-2 includes an Etalon filter. When the Etalon filter is used for the second filter 44-2 as a filtering element, it functions as a passive element so that other components to operate the passive element become unnecessary. A second EF 44-2 passes only the even channel signal. When the odd channel signal is transmitted to the second EF 44-2, the second EF 44-2 reduces the intensity of the odd channel signal by about 15 dB.

Accordingly, when the BPSR optical transmission node according to the present invention operates normally, the first EF 43-1 in the first filtering section 43 passes only the odd channel signal and provides it to the interleaver 45. An even channel signal from the interleaver 45 is directed to the first optical line 41 by the first circulator 43-1 without passing through the first EF 43-2. In the case where an obstacle occurs on the first optical line 41 and a wave has reflected at a loss of about 14 dB and enters the first filtering section 43, (in the case where only the even channel signal is reflected) the reflected wave passes through the first EF 43-2 so that the intensity of the reflected wave is reduced by about 15 dB. Then, after passing through the interleaver 45, the intensity of the reflected wave is reduced by about 20 dB for a total attenuation of 49 dB. Consequently, when the span loss of the optical fiber is 10~15 dB, the intensity of the reflected wave in an input terminal of the amplifier 46 becomes −39~−34 dB in comparison with that of the destination signal. The transmission characteristic is therefore not significantly affected.

Analogously, when the BPSR optical transmission node according to the present invention operates normally, the second EF 44-1 in the second filtering section 44 passes only the even channel signal and provides it to the interleaver 45. An odd channel signal from the interleaver 45 is directed to the second optical line 42 by the second circulator 44-1 without passing through the second EF 44-2. In the case where an obstacle occurs on the second optical line 42 and a wave has reflected at a loss of about 14 dB and enters the second filtering section 44, (in the case where only the odd channel signal is reflected) the reflected wave passes through the second EF 44-2 so that the intensity of the reflected wave is reduced by about 15 dB. Then, after passing through the interleaver 45, the intensity of the reflected wave is reduced by about 20 dB for a total attenuation of 49 dB. Consequently, when the span loss of the optical fiber is 10~15 dB, the intensity of the reflected wave in an input terminal of the amplifier 46 becomes −39~−34 dB as comparison with that of the destination signal. The transmission characteristic is therefore not significantly affected.

The BPSR optical transmission node according to the present invention further includes first and second photo detectors 43-3 and 44-3. The first photo detector 43-3 is arranged between the first EF 43-2 and the first circulator 43-1. The first photo detector 43-3 detects whether an obstacle occurs in the signal from the first EF 43-2. Since only the odd channel signal travels between the first EF 43-2 and the first circulator 43-1, the first photo detector 43-3 detects an optical signal due to the occurrence of an obstacle in the traveling path. That is, when an odd channel signal is not detected between the first EF 43-2 and the first circulator 43-1, it indicates the obstacle occurred on the first optical line 41. Also, when an even channel signal is not detected between the second EF 44-2 and the second circulator 44-1, it indicates the obstacle occurred on the second optical line 42.

According to the present invention as mentioned above, the BPSR optical transmission node has a simple configuration, reduces the influence on a reflected wave when an obstacle such as a cutting of an optical fiber occurs on an optical line, and is easily designed. After filtering, the BPSR optical transmission node signal is transmitted to only one direction. Thus, by checking the lines after the filtering, the present invention detects the occurrence of an obstacle such as the cutting of the optical fiber occurs on the optical line. Also, since an Etalon filter for a filtering element operates as a passive element and does not need other components to operate it, the cost of production is reduced.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A bi-directional path switched ring (BPSR) optical transmission node connected to a first optical line through which an odd channel signal and an even channel signal are respectively transmitted to and from the BPSR optical transmission node in directions opposite to each other, the BPSR optical transmission node being further connected to a second optical line through which the odd channel signal and the even channel signal are respectively transmitted from and to the BPSR optical transmission node in directions opposite to each other, the BPSR optical transmission node comprising:

a node section for directing the odd channel signal and the even channel signal in an equal direction, for amplifying the odd channel signal and the even channel signal, for at least one of dropping a desired channel from and adding a desired channel to at least one of the odd channel signal and the even channel signal, and for then allowing each of the odd channel signal and the even channel signal to proceed in a direction traveled by that channel signal upon arriving at the BPSR optical transmission node;

a first filtering means coupled between the first optical line and the node section, the first filtering means allowing only the odd channel signal from among signals transmitted through the first optical line to pass through the first filtering section without substantially any attenuation by said first filtering means, the first filtering means transferring the even channel signal from the node section to the first optical line; and a second filtering means coupled between the second optical line and the node section, the second filtering means allowing only the even channel signal from among signals transmitted through the second optical line to pass through the second filtering section without substantially any attenuation by said second filtering means, the second filtering means transferring the odd;

wherein the node section comprises:

an amplifier for amplifying the odd channel signal and the even channel signal;

an optical add/drop multiplexer for at least one of adding a desired channel to and dropping a desired channel from at least one of the odd channel signal and the even channel signal after said amplifying of the at least one channel signal; and an interleaver for routing the odd channel signal and the even channel signal, which have passed through the first and second filtering means, respectively, to the amplifier, and for routing the odd channel signal having passed through the optical add/drop multiplexer to the second filtering means and the even channel signal having passed through the optical add/drop multiplexer to the first filtering means.

2. A bi-directional path switched ring (BPSR) optical transmission node connected to a first optical line through which an odd channel signal and an even channel signal are respectively transmitted to and from the BPSR optical transmission node in directions opposite to each other, the BPSR optical transmission node being further connected to a second optical line through which the odd channel signal and the even channel signal are respectively transmitted from and to the BPSR optical transmission node in directions opposite to each other, the BPSR optical transmission node comprising:

a node section for directing the odd channel signal and the even channel signal in an equal direction, for amplifying the odd channel signal and the even channel signal, for at least one of dropping a desired channel from and adding a desired channel to at least one of the odd channel signal and the even channel signal, and for then allowing each of the odd channel signal and the even channel signal to proceed in a direction traveled by that channel signal upon arriving at the BPSR optical transmission node;

a first filtering means coupled between the first optical line and the node section, the first filtering means allowing only the odd channel signal from among signals transmitted through the first optical line to pass through the first filtering section without substantially any attenuation by said first filtering means, the first filtering means transferring the even channel signal from the node section to the first optical line, wherein the first filtering means includes:
  a first filter for allowing only the odd channel signal to pass through the first filter without substantial attenuation by the first filtering means; and
  a first circulator for directing a signal transmitted through the first optical line to the first filter, directing a signal transmitted from the first filter to the node section, and directing a signal transmitted from the node to the first optical line; and
a second filtering means coupled between the second optical line and the node section, the second filtering means allowing only the even channel signal from among signals transmitted through the second optical line to pass through the second filtering section without substantially any attenuation by said second filtering means, the second filtering means transferring the odd channel signal from the node section to the second optical line.

3. The bi-directional path switched ring optical transmission node in accordance with claim 2, wherein the second filtering means comprises:
  a second filter for allowing only the even channel signal to pass through the second filter without substantial attenuation by the second filtering means; and
  a second circulator for directing a signal transmitted through the second optical line to the second filter, directing a signal transmitted from the second filter to the node section, and directing a signal transmitted from the node to the second optical line.

4. The bi-directional path switched ring optical transmission node in accordance with claim 2, wherein each of the first filter and second filter is an Etalon filter.

5. The bi-directional path switched ring optical transmission node in accordance with claim 2, further comprising:
  a first photo-detecting means coupled between the first filter and the first circulator for detecting the odd channel signal; and
  a second photo-detecting means coupled between the second filter and the second circulator for detecting the even channel signal.

6. The bi-directional path switched ring optical transmission node in accordance with claim 1, wherein the first filtering means is configured to attenuate a reflection of the even channel signal by 15 dB.

7. The bi-directional path switched ring optical transmission node in accordance with, claim 6, wherein the second filtering means is configured to attenuate a reflection of the odd channel signal by 15 dB.

8. The bi-directional path switched ring optical transmission node in accordance with claim 1, wherein the first filtering means is configured to attenuate a reflection of the even channel signal by 15 dB.

9. The bi-directional path switched ring optical transmission node in accordance with claim 8, wherein the second filtering means is configured to attenuate a reflection of the odd channel signal by 15 dB.

10. The bi-directional path switched ring optical transmission node in accordance with claim 2, wherein the first filtering means is configured to attenuate a reflection of the even channel signal by 15 dB.

11. The bi-directional path switched ring optical transmission node in accordance with claim 10, wherein the second filtering means is configured to attenuate a reflection of the odd channel signal by 15 dB.

12. The bi-directional path switched ring optical transmission node in accordance with claim 3, wherein the first filtering means is configured to attenuate a reflection of the even channel signal by 15 dB.

13. The bi-directional path switched ring optical transmission node in accordance with claim 12, wherein the second filtering means is configured to attenuate a reflection of the odd channel signal by 15 dB.

* * * * *